Patented June 25, 1940

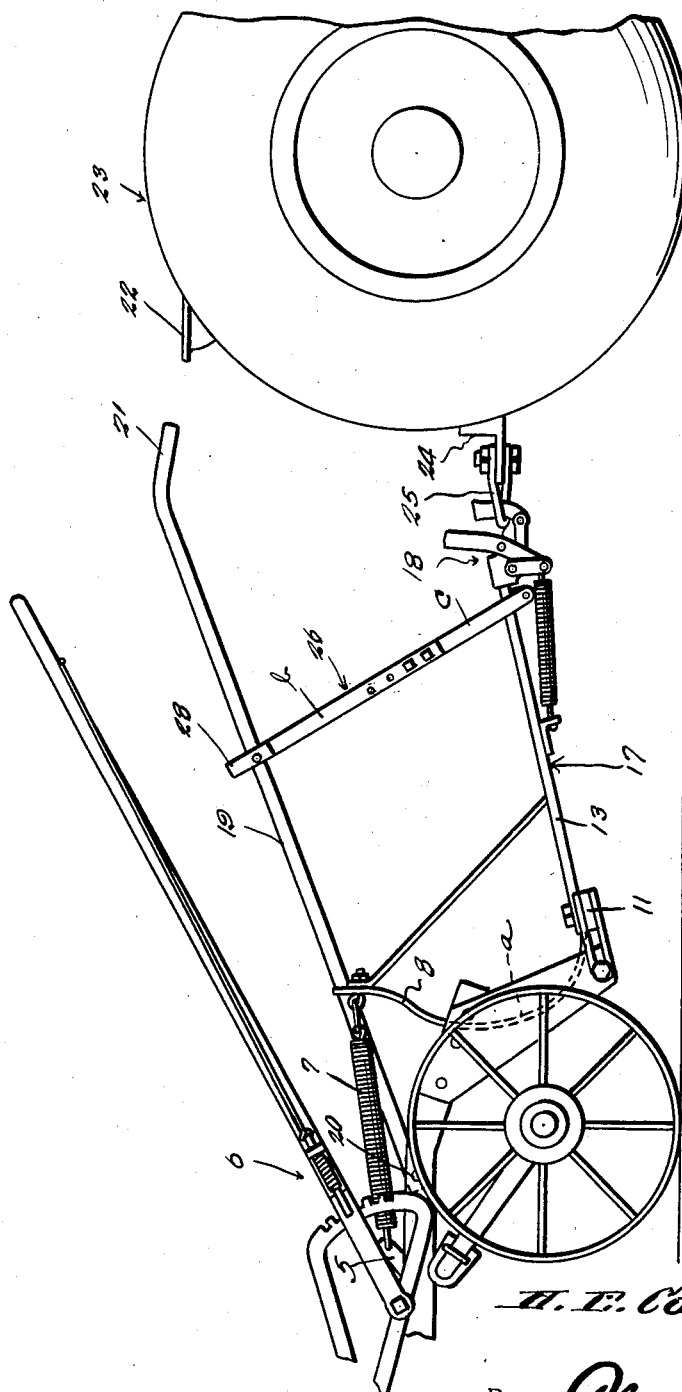

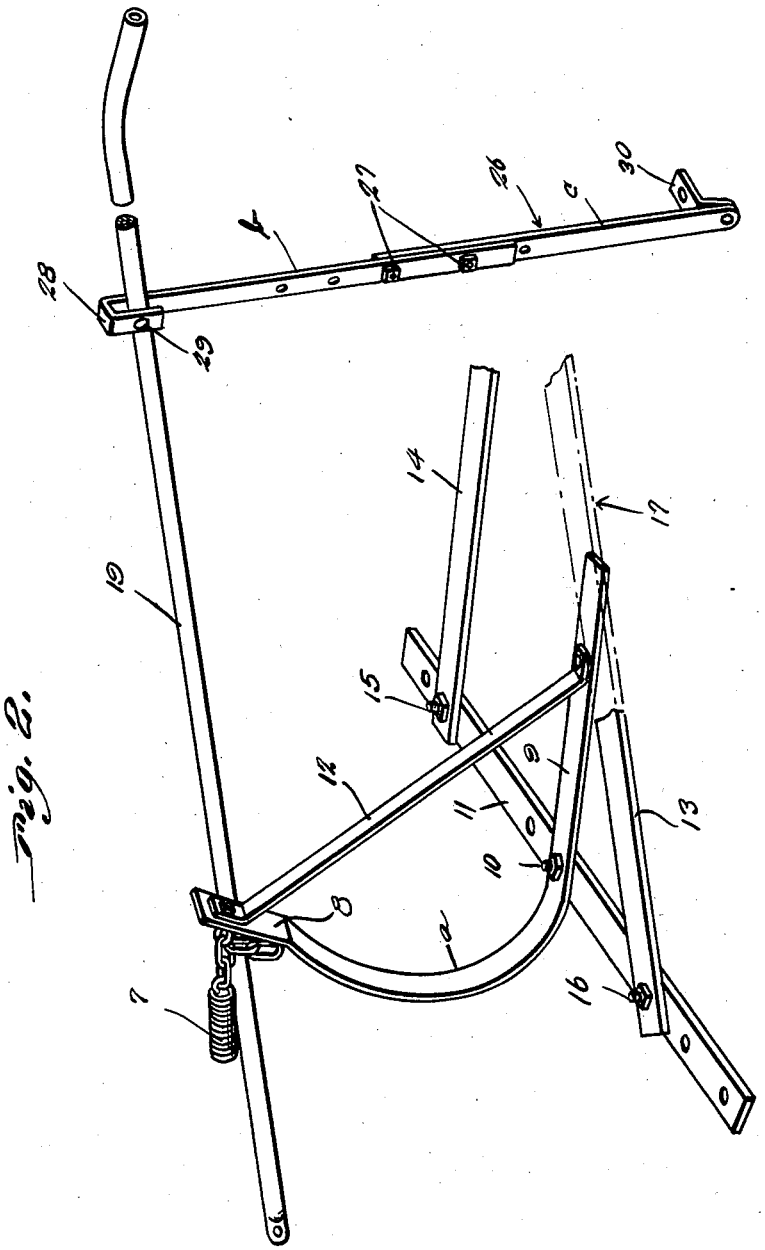

2,205,619

UNITED STATES PATENT OFFICE 2,205,619

PLOW HITCH CONTROL

Harry E. Covert, Leslie, Mich.

Application September 13, 1938, Serial No. 229,749

2 Claims. (Cl. 97—47)

This invention appertains to new and useful improvements in controls for plow hitches, the principal object of the invention being to provide a mechanism which will conveniently enable tractor operator to engage or disengage the plow from the tractor without requiring his leaving the tractor's seat.

Other objects and advantages of the invention will become apparent to the reader of the following specification.

In the drawings:

Figure 1 represents a side elevational view.

Figure 2 is a fragmentary perspective view of the mechanism.

Referring to the drawings wherein like numerals designate like parts, it can be seen that numeral 5 represents an arm which is fastened to the land wheel axle of the conventional plow mechanism generally referred to by numeral 6.

Numeral 7 denotes the spring which extends from the arm 5 to the upper end of the tongue member 8, this tongue member having the curved substantially vertical portion *a* merging with the forwardly extending leg 9. The leg 9 at its rear end is secured by the nut and bolt 10 to the intermediate portion of the cross bar 11 and a bracket 12 has its upper end secured to the upper portion of the tongue 8 and its lower portion to the forward end portion of the leg 9, this leg 9 extending under the obliquely disposed bar 13 of the hitch supporting frame which includes a cross bar 11 and the forwardly extending bar 14, the latter being secured as at 15 to the cross bar 11 while the obliquely disposed bar 13 is secured as at 16 to the cross bar 11.

The forward end of this hitch supporting frame which is denoted by numeral 17 carries the hitch mechanism generally referred to by numeral 18 and this is of conventional design.

Numeral 19 represents the elongated hand bar which is pivotally connected as at 20 to the frame of the plow 6 and extends forwardly to terminate in an oblique extension 21 adjacent the driver's seat 22 of the tractor generally referred to by numeral 23. Numeral 24 represents the tail piece of the tractor from which extends the eye 25 with which the conventional hitch 18 connects.

Numeral 26 represents the connecting bar between the hand bar 19 and the supporting frame 17, the same consisting of the upper section *b* and a lower section *c*, the interlapping end portions of which are formed with openings for the reception of bolts 27. The upper end of the section *b* has a U-shaped extension 28 for embracing the hand bar 19 and this is secured as at 29 to the hand bar.

The lower end of the section *b* has a swingably connected bracket 30 which is connected to the forward portion of the supporting frame 17. The connection 26 permits adjusting of the hand bar 19 to seats of various heights.

The hand lever or hand bar 19 is employed to engage or disengage the plow from the tractor through the means of the hitch 18.

After the plow strikes an obstruction and tips from the tractor, a slight pressure on the hand bar places the hitch in position to be connected to the tractor again. Thus, this hitching and unhitching can be accomplished without the operator leaving the seat 22.

In the operation of this mechanism, it will be observed that when the plow (not shown) is operating in the ground, the bar 13 and in fact the entire frame 17 is thrown upwardly to substantially the position shown in Figure 1 and, of course, can be operated downwardly regardless of the position of the plow by the hand bar 19 against the tension of the spring 7. For instance, assuming that the hitch is connected as shown in Figure 1 and the operator of the tractor 23 wishes to disconnect the same. The operator will back up his tractor slightly so that the draft link 25 is loose on the hitch 18. The operator now depresses the hand bar 19 against the tension of the spring 7 and this lowers the hitch 18 and immediately the operator can move his tractor forwardly and continue on, leaving the agricultural machine behind. When the operator desires to rehitch the tractor to the agricultural machine, he simply backs the draft member 25 toward the hitch 18 and then grips the handle 21 to force the hand bar 19 downwardly so that he can back the tractor to a position with the link 25 disposed over the hook of the hitch. When the parts have been thus positioned the handle 25 can be released and the spring 7 will lift the frame 17 so that the hitching operation will be consummated.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination, an agricultural machine including a ground engageable tool, a tractor, a coupling element on the tractor, a hitch normally held engaged with the coupling element by the ground engaging action of the ground engaging element and manual means on the machine accessible to a person on the tractor for operating the hitch independently of the ground engaging element.

2. In combination, an agricultural machine including a ground engageable tool, a tractor, a coupling element on the tractor, a hitch normally held engaged with the coupling element by the ground engaging action of the ground engaging element and manual means on the machine accessible to a person on the tractor for operating the hitch independently of the ground engaging element, said hitch being provided with a frame swingably connected to the machine, spring means tending to urge the frame and hitch upwardly at its tractor attachable end, said manual means consisting of a swingable hand bar having a handle at its forward end and a rigidly connecting member between the hand bar and the hitch for operating the hitch to disengaged position upon depression of the hand bar.

HARRY E. COVERT.